May 26, 1936.  L. W. EGGLESTON  2,042,217
HEATING SYSTEM AND CONTROL MEANS THEREFOR
Filed Feb. 20, 1934  3 Sheets-Sheet 1
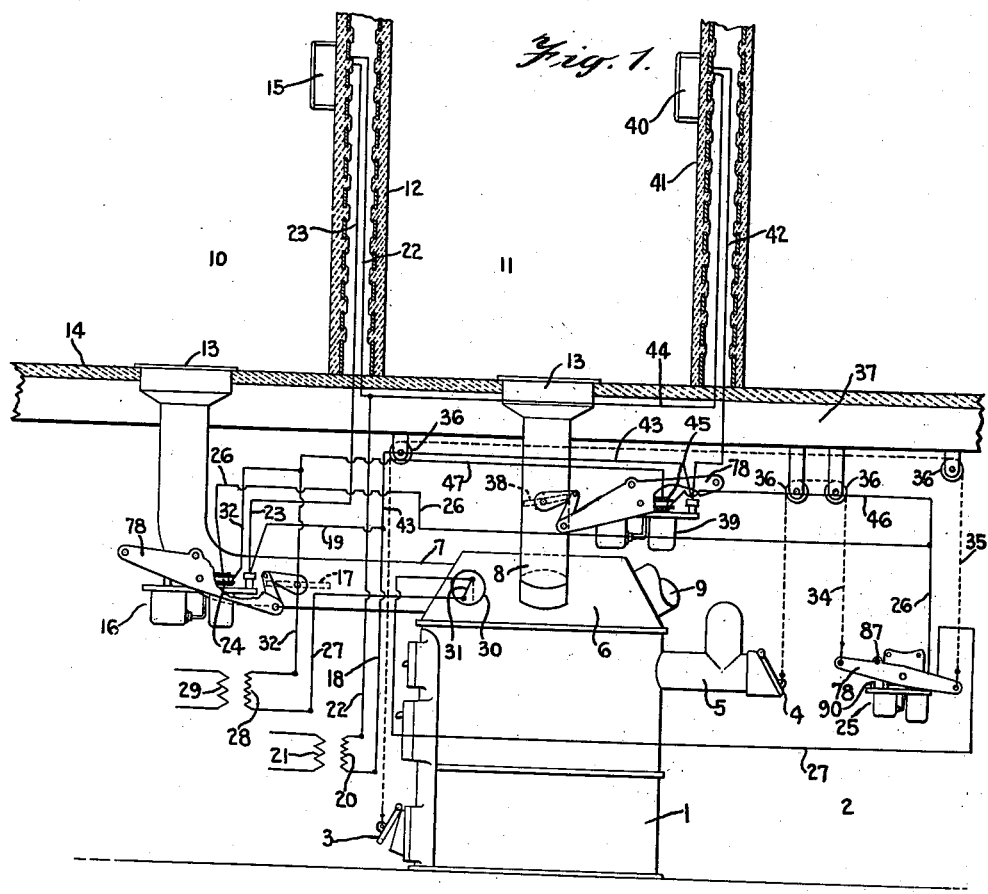
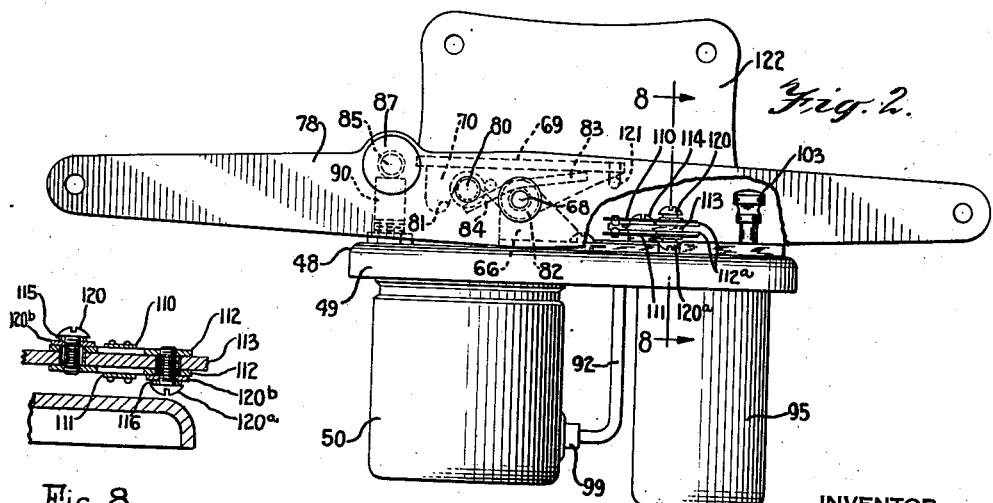
INVENTOR
Lewis W. Eggleston
BY
his ATTORNEY May 26, 1936.   L. W. EGGLESTON   2,042,217
HEATING SYSTEM AND CONTROL MEANS THEREFOR
Filed Feb. 20, 1934   3 Sheets-Sheet 2

INVENTOR
Lewis W. Eggleston
BY
his ATTORNEY

May 26, 1936.  L. W. EGGLESTON  2,042,217
HEATING SYSTEM AND CONTROL MEANS THEREFOR
Filed Feb. 20, 1934  3 Sheets-Sheet 3
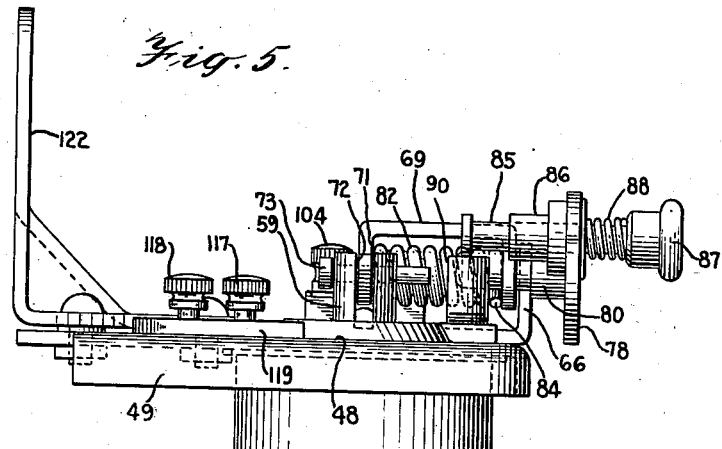
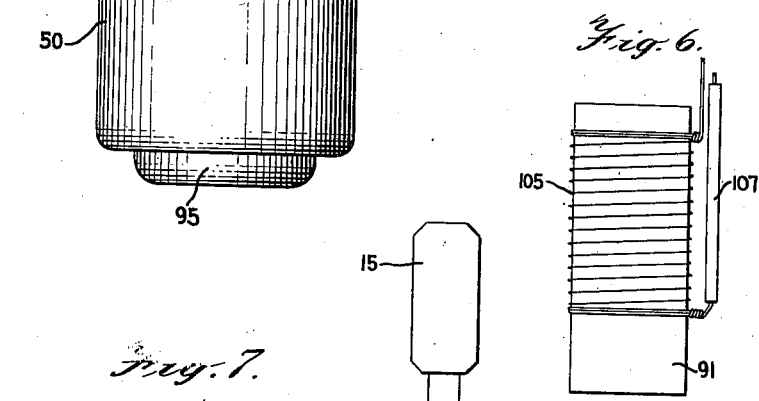
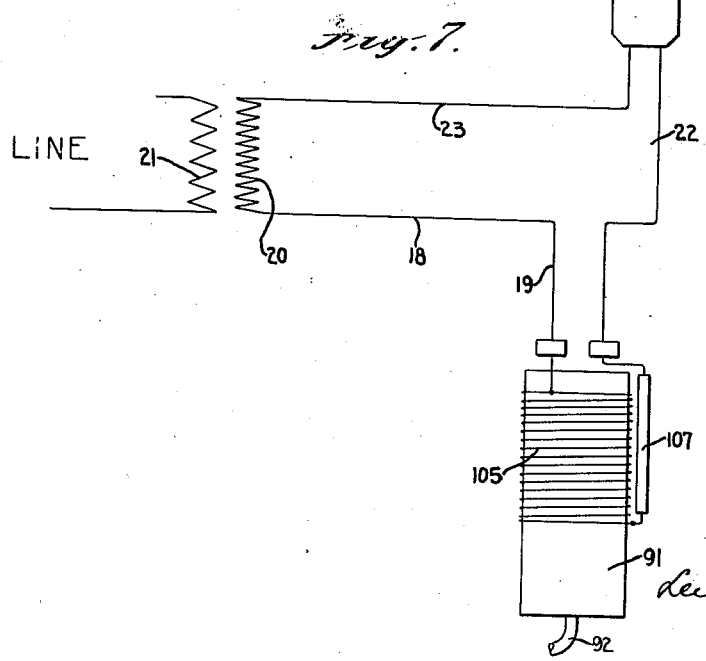
INVENTOR
Lewis W. Eggleston
BY
his ATTORNEY Patented May 26, 1936

2,042,217

UNITED STATES PATENT OFFICE 2,042,217

HEATING SYSTEM AND CONTROL MEANS THEREFOR

Lewis W. Eggleston, Detroit, Mich., assignor to Detroit Lubricator Company, Detroit, Mich., a corporation of Michigan Application February 20, 1934, Serial No. 712,117

18 Claims. (Cl. 236—11)

My invention relates to new and useful improvements in heating systems and means for controlling the same. The system is particularly adapted for use in connection with the heating of residences or apartments and has for one of its objects the provision of means for controlling the heating apparatus in accordance with the demands of separate rooms or zones to be heated.

Another object is to provide a system in which overheating of the room or zone will be prevented.

Another object is to provide a heating system in which means for controlling the supply of the room or zone heating medium serves to control the heating apparatus.

Another object is to provide novel motor means for actuating the valves or dampers embodied in the system.

Another object is to provide a valve or damper control means which is operable to control means for regulating the heating apparatus.

The invention consists in my improved system and the interrelated elements comprising the same, together with the novel construction embodying certain of the elements thereof, all of which will be more fully described hereinafter and the novelty of which will be particularly pointed out and distinctly claimed.

In the accompanying drawings, to be taken as a part of this specification, I have fully and clearly illustrated a preferred embodiment of my invention, in which drawings—

Figure 1 is a view, partly diagrammatic, of my heating system and the control means therefor;

Fig. 2 is a view in front elevation of a motor embodied in my system;

Fig. 5 is a view in side elevation of the motor or device looking from the left toward the right of Fig. 3;

Fig. 6 is a detail view of a heating element forming a part of the motor,

Fig. 7 is a wiring diagram of a circuit including the heating element, and

Fig. 8 is a detail view on the line 8—8 of Fig. 2.

Figure 3:
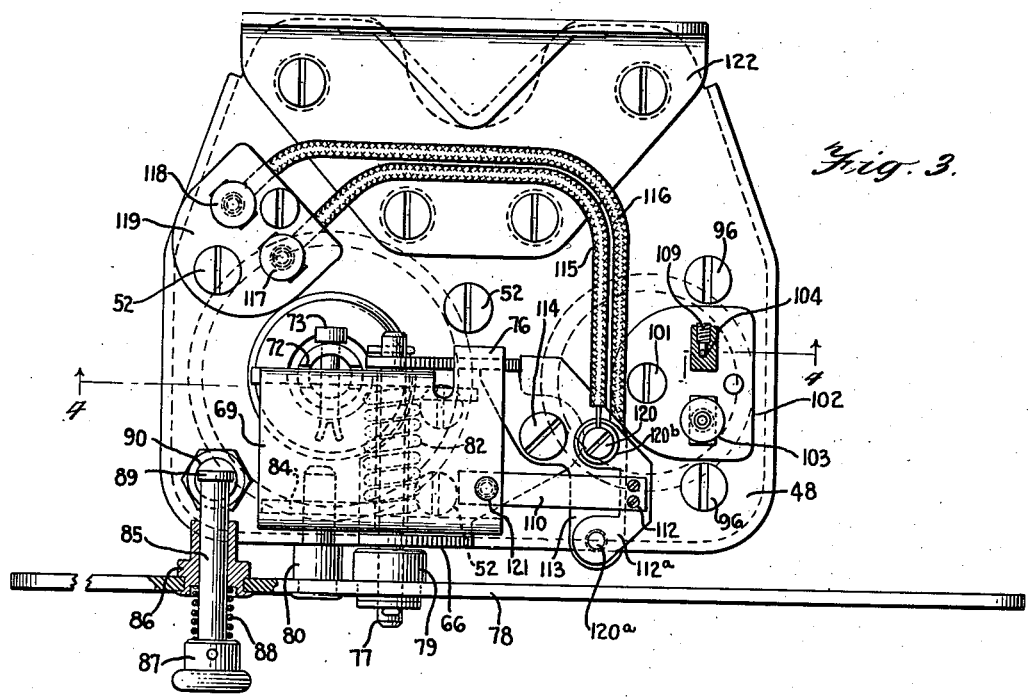
Fig. 3 is a top plan view of the device shown in Fig. 2.

Referring to the drawings by characters of reference, I designates generally a heating apparatus such as a hot air furnace which may be positioned in the basement 2 of a house or other structure to be heated thereby. The furnace I is shown as of the coal-fired type having a draft inlet damper 3 controlling an ash pit air inlet and having a check damper 4 controlling the inlet of air to the smoke pipe 5 or outlet duct from the combustion chamber of the furnace. The dampers 3 and 4 comprise means for regulating the heating apparatus and particularly operate to regulate the temperature to which the medium heated by the furnace is subjected, and therefore the dampers serve to control or regulate the temperature of the medium heated by the furnace. The furnace is provided with a dome or bonnet 6 to which the heating medium or the heat transferring medium is supplied in the usual manner and from which conduits or ducts designated 7, 8 and 9 lead to the regions or zones to be heated. The ducts 7 and 8 are shown as opening into the rooms or zones 10, 11 respectively which are separated by a wall or partition 12. Although the ducts are shown as having their outlets 13 opening into the rooms 10, 11 through the floor 14, it is obvious that the ducts may discharge into the rooms through a side wall thereof as desired. In the room 10 there is a thermostat 15 responsive to temperature of the room air and which is preferably mounted on the partition 12. The thermostat 15 may be of any of the well known types on the market having switch means closed by a temperature responsive element when the room temperature is below the desired degree for which the thermostat is set to operate, that is, when the thermostat is unsatisfied or calling for heat. The thermostat 15 actuates an automatic control means 16 which operates a valve or damper 17 controlling flow of the heat transferring medium through the duct 7. The motor means 16 is connected by lead wires 18, 19 to the secondary side 20 of a transformer having its primary side 21 connected to a source of current supply. From the other side of the transformer secondary 20 a lead wire 22 extends to one contact of the switch means of the thermostat 15. From the other contact of the thermostat switch means a lead wire 23 connects with the motor means so that the thermostat, the motor means and the transformer secondary are in series circuit. The motor means 16 is provided with an electric switch means 24 which is operated by the means 16 when the damper 17 is moved to open position to close the circuit of an automatic control means 25 such as a heat motor for actuating the regulating means of the apparatus. The switch means 24 is connected by a lead wire 26 to the motor control means 25 and from the means 25 a lead wire 27 connects to the secondary 28 of a transformer having its primary 29 connected to a source of current supply. In the lead wire 27 there is a safety switch 30 which is responsive to temperature of the heat transferring medium in the bonnet 6. Switch 30 comprises a switch arm 31 operable by any suitable heat responsive means such as a bi-metal element, or the like, to make and break circuit through the wire 27, the blade 31 being shown by dotted line in its circuit breaking position. The switch 30 is preferably set to break circuit at a predetermined maximum bonnet temperature so as to actuate the regulating means of the heating apparatus to stop further heating of the heat transferring medium and to shut down the heating apparatus. From the other side of the transformer secondary 28 a lead wire 32 connects to the switch means 24. The motor means 25 is provided with a pivoted lever arm which has its opposite ends connected by connecting means 34, 35 such as chains to the check and draft dampers 4, 3 respectively. The chains 34 and 35 are preferably strung over pulleys 36 preferably supported by the beams 37 which support the floor 14. The chains 34 and 35 are connected to their respective dampers in the usual manner such that the damper 3 is opened when the damper 4 is closed and vice versa, and also so that the dampers may be simultaneously closed. The duct 8 is provided with a valve or damper 38 operated by an automatic control means 39 similar to the means 16. The control means 39 is actuated in response to operation of a room thermostat 40 similar to the thermostat 15 and mounted on a side wall 41 of the room 11. One side of the switch of thermostat 40 is connected by a lead wire 42 to the motor control means 39 which is connected by a lead wire 43 to the lead wire 18 connected to the transformer secondary 20. The other side of the switch of thermostat 40 is connected by a lead wire 44 to the lead wire 22 which extends from the other side of the transformer secondary so that the room thermostat 40, the motor means 39 and the transformer secondary 20 are in series circuit. It will be noted that the thermostat 15 and motor means 16 are in parallel circuit with the thermostat 40 and its motor means 39. The motor means 39 is provided with a switch means 45 which is moved by the motor means 39 to closed circuit position when the damper 38 is moved to open position. The switch means is provided with a lead wire 46 which connects to the lead wire 26 for the motor means 25 and is also provided with a lead wire 47 which connects to the lead wire 32 so that when the switch means 45 is closed, a circuit will be completed from the transformer secondary 28 through lead wire 27 and its switch 30 to the motor means 25 and thence via lead wires 26 and 46, the switch means 45 and lead wires 47 and 32 back to the transformer secondary 28.

Figure 4:
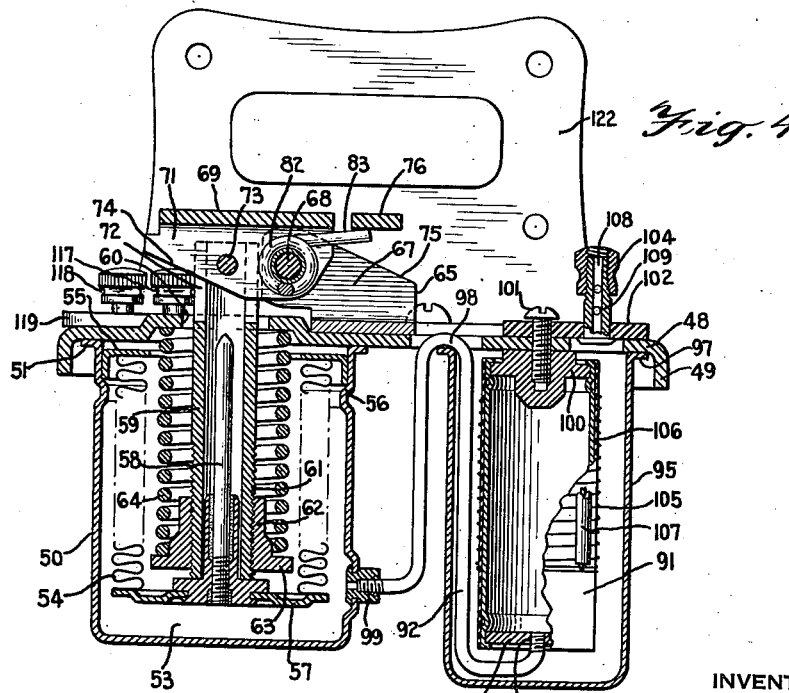
Fig. 4 is a view in section on the line 4—4 of Fig. 3.

In Figs. 2, 3, 4 and 5 I have shown in detail the preferred construction of the control means, designated 16, 25 and 39, which control means are of substantially the same construction. A supporting plate or base member 48 is provided having a down turned marginal flange 49 and to the underside of which is secured a heat operated motor. This motor comprises a casing 50 which is substantially cup-shaped, having a marginal surrounding flange 51 which seats against the underside of the plate 48 and which is engaged by nuts or bolts 52 which clamp the casing 50 tightly to the plate 48. Within the casing 50, there is an expansion chamber 53 having its top wall formed by a diaphragm means 54, preferably a longitudinally expansible and contractible element such as a metal bellows. The bellows element is secured and sealed at its upper end to an annular supporting member 55 which fits within the top end of the casing 50, being sealed thereto and seating on an internal annular shoulder 56 formed in the side wall of the casing. The lower end of the bellows is closed and sealed by a head or end wall 57 having a filler tube 58 extending upwardly therefrom. The head 57 supports a hollow thrust member or rod 59 which surrounds the tube 58 and which projects upwardly within the bellows and through an aperture 60 in the supporting plate 48. The lower end portion of the thrust member 59 is screw-threaded, as at 61, to receive an adjustable collar or nut 62 having a circumferential, laterally projecting flange 63. Seated on the flange 63 is one end of a helical coil spring 64 which at its other end engages the supporting plate 48 seating in a recess formed in the underside thereof. The spring 64 is held under compression between the nut 62 and the plate 48 so that it acts to hold the thrust member 59 in engagement with the head 57 and determines the force in chamber 53 which will move the thrust member 59 upwardly. Secured to the top face of plate 48 there is a supporting member or bracket 65 which is preferably substantially U-shaped, having upwardly extending supporting arms 66, 67 which are substantially parallel to the front edge of the supporting plate 48. Extending through the supporting arms adjacent the upper end of the thrust member 59 there is a bearing shaft or rod 68 which serves to pivotally support a rocker or actuating member 69. The member 69 has front and rear depending side flanges 70, 71 provided with aligned apertures to receive the shaft 68 and which are positioned between and substantially in engagement with the arms 66, 67 to prevent movement of the rocker member longitudinally of the shaft 68. The flange 71 extends into a longitudinal end slot 72 formed in the top end of the thrust member 59 and is pivotally secured therein and to the thrust member by a pivot pin 73. The underside of the flange 71 is inclined upwardly, as at 74, to provide a stop face or portion engageable with the plate 48 to limit downward movement of the thrust member 59 or counter-clockwise movement, facing Fig. 4, of the rocker member 69. The arm 67 has an inclined stop face or portion 75 engageable by a projecting lug or ear 76 on the member 69 to limit upward movement of the thrust member 59 or clockwise movement, facing Fig. 4, of the member 69. Supported on the forwardly projecting end 77 of the shaft 68 there is a lever arm or operating member 78 provided with a sleeve or hub 79 preferably journaled on the end portion 77. The lever arm 78 is operatively connected to the rocker member 69 by a pin or projecting element 80 secured to the arm 78 and extending rearwardly into a downward open recess or notch 81 in the flange 70. The pin 80 is held in engagement with the member 69 by a spring 82 coiled about the shaft 68 between the flanges 70, 71 and having one end 83 engaging the member 69 and particularly the lug 76, and having its other end 84 engaging the underside of the pin 80 so as to urge it into engagement with the base of the recess 81. The spring 82 provides a lost motion connection permitting relative movement between the lever arm 78 and the actuating member 69. The arm 78 is pivoted substantially at its midportion on the shaft 68 and is provided with a latch means to hold it against movement under the force of spring 64 and preferably in substantially horizontal position or midway of its range of movement. The latch means comprises a longitudinally movable pin or stop member 85 slidably supported in a bearing sleeve 86 secured in and extending transversely to the lever arm 78. The pin 85 is provided with a head or hand grip portion 87 by which it may be moved inwardly into holding position against the force of a coil spring 88 which surrounds the pin 85 and is held under compression between the head 87 and the arm 78 so that it normally tends to move the pin out of its holding position. The pin 85 is provided on its inner end with a flange 89 which engages the inner or rear end face of the sleeve 86 to prevent withdrawal of the pin 85 from the sleeve member 86. The pin 85 is movable into overlying frictional engagement with the top end of a stop member 90 which is vertically adjustable in the supporting plate 48. The pin 85 is held in frictional engagement with the post 90 under the force of spring 64.

The expansion chamber 53 is connected to a bulb element 91 by means of a tube 92 of small bore. The tube 92 opens, as at 93, into the bulb element 91 through a bottom wall or head 94 which closes and seals the bottom end of the element 91. The bulb element is housed within a casing 95 which serves to insulate the element 91 from the chamber 53 and which is rigidly secured to the underside of the supporting plate 48 by nuts and bolts, or the like, 96 engaging a marginal flange 97 on the casing 95. The tube 92 extends upwardly within the casing 95 and over the top edge thereof, as at 98, and thence downward to a point adjacent the bottom of the chamber 53, at which point it opens thereinto through a fitting element 99. The bulb element 91 is provided with an upper head or end wall 100 which closes and seals the top end of the bulb element. The bulb element is secured to the underside of the plate 48 by a screw 101 which extends through the plate 48 and is threaded into the head 100. The screw 101 also serves to secure a pad or plate 102 of electric insulating material to the top face of the supporting plate 48. Supported by the pad or plate 102 and projecting upwardly therefrom there are terminal or binding posts 103, 104. These posts are connected to the opposite ends of a heater coil 105 which surrounds the bulb element 91, being suitably electrically insulated therefrom by a covering 106 of insulating material such as mica wrapped around the element 91 and underlying the coil 105. The lead wire which extends upwardly from the lower end of the coil is electrically insulated from the turns of the coil by a glass tube 107. The binding posts 103 and 104 are provided with longitudinal bores 108 into which the end portions or lead wires of the coil 105 extend, being secured therein by set screws 109. The bulb element 91 and the chamber 53 are charged with a suitable volatile liquid such as acetone or alcohol, the liquid substantially completely filling the bulb element and chamber when the bellows has been extended to bring the stop portion 74 into engagement with the plate 48.

The control device also includes a switch means which is operated by the rocker member 69. This switch means comprises upper and lower vertically spaced switch blades 110, 111 provided with suitable contact elements or members carried by the free end portions of the switch blades. The blades 110, 111 are of resilient sheet metal and are rigidly secured by screws, or the like, 112 to vertically spaced, metal conductor plates 112ª fixed to a supporting block 113 of electric insulating material which is fixed to the top face of the plate 48 by a screw 114. The blades 111, 110 are connected by lead wires 115, 116 respectively to terminal posts 117, 118 carried by a pad or plate 119 of electric insulating material secured to the top face of the supporting plate 48 by one of the bolts 52. The lead wires 115, 116 are secured to their respective conductor plates 112ª by binding screws 120, 120ª which are electrically insulated by washers 120ᵇ from the supporting plates 112ª for blades 110, 111 respectively, see Fig. 8. The rocker member 69 is provided with an abutment 121 of electric insulating material which is engageable with the switch blade 110 to move the blade 110 into engagement with the blade 111 to close an electric circuit. The abutment member 121 preferably actuates the switch means to make circuit substantially at the end of clockwise travel of the rocker member 69, overtravel of the rocker member after the blades are in engagement being permitted due to the flexibility of the blades. The control device is preferably provided with a supporting bracket 122 which is secured to the supporting plate 48 and by which the control device may be rigidly mounted in operative position.

The operation of my system and of the control means or device is as follows, the system having been wired to provide the circuits above described and the lever arms 78 of the motor means 16 and 39 respectively being connected by suitable operating linkage to their respective dampers 17 and 38: As shown, the thermostat 40 has been satisfied so that the circuit through the lead wires 42 and 44 controlled thereby is broken at the thermostat. Breaking of the circuit through the lead wires 42, 44 has broken the circuit from the transformer secondary 20 thereby deenergizing the heater coil 105 of the motor means 39. With the circuit broken through the heater coil 105, the vaporized liquid in bulb element 91 will condense and contract, permitting the spring 64 of motor means 39 to move the rocker member 69 and its lever arm 78 counter-clockwise thereby releasing the switch blade 110 and moving the damper 38 to closed position. The breaking of circuit between the switch blades 110, 111 of the switch means 45 will not affect the motor means 25 as the circuit thereto is completed by a parallel circuit through the switch means 24 of the motor means 16. The thermostat 15 is unsatisfied and calling for heat as the room or zone 10 is below the desired temperature. The circuit at the thermostat 15 is therefore closed through lead wires 22, 23 so that the heater coil 105 of the motor means 16 is energized by the transformer secondary 20. As the bulb element 91 heats up under the influence of coil 105, liquid will be forced through the tube 92 into the chamber 53 which will force the thrust member 59 upward. This movement of the thrust member 59 will continue until the stop member 76 engages the stop face 75, when the lever arm 78 of motor means 16 will be in the position shown in Fig. 1. Movement of the lever arm 78 of motor means 16 to this position in which it will be held as long as current is supplied to the coil 105 acts through its connecting linkage to move the damper 17 to open position and to move abutment member 121 into engagement with the switch blade 110 to close the switch means 24. The circuit through lead wires 26 and 32 controlled by switch means 24 completes the circuit from the transformer secondary 28 through the safety switch 30 and the heater coil 105 of the motor means 25. Energization of the motor means 25 acts as above described with respect to the motor means 16 to rotate the lever arm 78 of motor means 25 in a clockwise direction to the position shown, in which it will be held as long as the switch means 24 is maintained closed. With the lever arm 78 of motor means 25 in the position shown, the heating apparatus 1 will be regulated by the dampers 3, 4 to heat the heat transferring medium in the bonnet 6, that is, the lever arm 78 will pull on the chain 35 to open the draft damper 3 and will release the chain 34 sufficiently to permit the damper 4 to move by gravity to closed position. If the temperature in the bonnet 6 should rise above the desired degree, the thermostatically operated safety switch 30 will be actuated to move its switch arm 31 to the dotted line position thereby breaking the circuit from the transformer secondary 28 to the heat coil 105 of motor means 25 so that the spring 64 of this motor means will act through its lever arm 78 to pull on the chain 34 to open the check damper 4 and will release the chain 35 to permit the damper 3 to move to closed position thereby checking the fire and stopping further heating of the heat transferring medium in bonnet 6. When the bonnet temperature decreases sufficiently to permit closing of safety switch 30, the motor means 25 will again be energized to open the draft damper 3 and close the check damper 4 if either of the thermostats 15 or 40 is unsatisfied and calling for heat. When the room thermostat 15 becomes satisfied and breaks circuit through the lead wires 22, 23 thereby deenergizing the heater coil 105 of motor means 16, then the spring 64 of this motor means will rotate its lever arm 78 to close the damper 17 and release its switch blade 110 so as to open the circuit to motor means 25 through the lead wires 26 and 27. If the thermostat 40 is still satisfied so that the circuit is broken thereat through lead wires 42 and 44, then the heater coil 105 of motor means 25 will be deenergized and the spring 64 of this motor means 25 will act through its lever arm 78 as above described to close the draft damper 3 and open the check damper 4. The latch means above described comprising pin 85 is provided to permit manual control of the dampers 3, 4 when it is desired to stoke or fire the furnace. If the thermostats 15 and 40 are both satisfied, the draft damper 3 will be closed and the check damper 4 will be open as above described but it is desirable that the dampers both be in closed position during the firing operation. The furnace attendant may grasp the lever arm 78 of motor means 25 and manually move it against the force of spring 64 until the arm is in the position shown in Figs. 2 and 3, when the pin 85 may be pushed inwardly into overlying relation to the stop post 90 and be manually so held while the lever arm is released to permit the spring 64 to hold the pin 85 frictionally in engagement with the stop post 90. After the firing operation is completed, the latch means may be manually released by rotation of the lever arm to lift the pin off of the post 90 so that the pin 85 will be retracted by the spring 88. If the lever arm 78 of motor means 25 is left in this last position and not manually released, then if either thermostat 15 or thermostat 40 becomes unsatisfied and calls for heat so as to cause closing of the switch means 24 or 45 respectively, then the heater coil 105 of the motor means 25 will be energized to move its lever arm 78 to the position shown in Fig. 1 thereby automatically releasing the latch means for retraction by the spring 88 so that the motor means 25 will again be in complete control of the heating apparatus and be operable to close the draft damper 3 and open the check damper 4, when thermostats 15 and 40 again both become satisfied. The post 90 of the latch means for the motor means 16 and 39 is preferably adjusted so that when in latched position the dampers 17 and 38 will be held in open position and the switch means 24 and 45 will be closed by their respective rocker members 69. It is thus possible to manually regulate the heating apparatus to supply heat to either the zone 10 or to the zone 11 independently of the thermostats 15 and 40 respectively, in the event either thermostat should become inoperative. Under this condition with either of the switch means 24 or 45 latched in closed position, the heating apparatus would be under the control of the safety switch 30 which would operate through the motor means 25 to prevent overheating of the furnace 1. Assuming the thermostats 15 and 40 to be operative, then if the lever arm 78 of either motor means 16 or 39 were manually latched in position to close the switch means 24 and 45 or either of them, the heating apparatus would be under control of the safety switch 30 and continue to supply heat until the thermostat controlling the latched motor means became unsatisfied, when it would close the circuit to the heater coil of the latched motor means and move the lever arm 78 sufficiently to release the latch pin 85 thereby when the thermostat again became satisfied permitting the released lever arm to close its draft damper and open its switch controlling the motor means 25.

From the foregoing description it will be apparent that a heating system is provided in which a heating apparatus is controlled in response to the requirements of separate zones or regions to be heated thereby. It will also be noted that operation of the safety means 30 to stop or decrease heating of the bonnet 6 does not act to close the dampers 17 or 38 so that the furnace is cooled by the flow of the heat transferring medium passing thereinto and discharging through the ducts 7 and 8 thereby preventing injury to the heating apparatus which might result if the duct dampers were closed.

What I claim and desire to secure by Letters Patent of the United States is:

1. A heating system comprising a furnace having a bonnet, a duct for conveying air from said bonnet to a room to be heated, a damper in said duct, means acting to close said damper, an electrically energized motor operable when energized to overcome said closing means and having a lever arm operatively connected to said damper, a thermostat controlling the circuit of said motor and responsive to temperature in said room, an electric switch actuated by and upon movement of said lever arm to open said damper, electrically operated means having its circuit controlled by said switch and controlling the temperature of said furnace, and switch means responsive to the temperature of said bonnet and controlling said last-named electrically operated means.

2. A heating system comprising a heating apparatus having draft and check dampers, a motor having a lever arm, means operatively connecting said arm to said dampers, said motor comprising an expansion chamber having a movable wall, a bulb element communicating with said chamber, an electric heating element for said bulb element, a thrust member operable by said wall, a pivotally supported member engaged by said thrust member, means operatively connecting said pivotally supported member and said lever arm, means controlling flow of the medium heated by said furnace, switch means operable by said controlling means and controlling said heating element, and a thermostat responsive to temperature created by said furnace and controlling said controlling means.

3. A device of the character described, comprising a supporting member, motor means secured to the underside of said supporting member, said supporting member having an aperture therethrough, a rocker member pivotally mounted upon said supporting member, a thrust member extending through said aperture and operatively connecting said rocker member and said motor means, a lever having a fulcrum support, means connecting said rocker member and said lever, said last-named means including a spring to permit relative movement between said lever and said rocker member, and switch means operable upon operation of said lever.

4. A heating system comprising a hot air heating furnace for heating air to be supplied to a room or enclosure, a duct connecting the furnace bonnet to said room, a damper in said duct, said damper having an arm, a switch operable by said arm, an electrically energized operating means for actuating said arm, switch means responsive to room temperature for closing the circuit of said operating means, and means controlled by said switch for regulating the rate of combustion in said furnace.

5. A heating system comprising a hot air heating furnace for heating air to be supplied to a room or enclosure, a duct outlet leading from the furnace bonnet, a damper in said duct, said damper having an arm, a switch operable by said arm, an electrically energized operating means for actuating said arm, switch means responsive to room temperature for closing the circuit of said operating means, and means controlled by said switch for regulating the rate of combustion in said furnace.

6. A heating system comprising a hot air heating furnace for heating air to be supplied to a room or enclosure, a duct outlet leading from the furnace bonnet, a damper in said duct, said damper having an arm, a switch operable by said arm, an electrically energized operating means carried by said duct for actuating said arm, switch means responsive to room temperature for closing the circuit of said operating means, and means controlled by said switch for regulating the rate of combustion in said furnace.

7. A heating system comprising a hot air heating furnace for heating air to be supplied to a room or enclosure, a duct leading from the furnace bonnet, a damper in said duct, a damper controlling the rate of combustion in said furnace, said first damper having an arm, a switch operable by said arm, an electrically energized operating means for actuating said arm, switch means responsive to room temperature for closing the circuit of said operating means whereby to actuate said first damper, and an electrically energized operating means for said second damper controlled by said switch whereby furnace combustion is regulated in accordance with the position of said first damper.

8. A heating system comprising a heating apparatus operable to heat a heat transferring medium, a conduit to convey the medium to a region to be heated, a second conduit to convey the medium to a second region to be heated, a normally closed valve in said first conduit, a normally closed valve in said second conduit, a thermostat responsive to temperature in said first region, means operable by said thermostat to move said first valve to open position, means to control said heating apparatus and tending to move to a position to stop heating of said medium, means actuated by said thermostat operated means to move said apparatus control means to supply heat to said medium, a thermostat responsive to temperature in said second region, means operable by said second thermostat to move said second valve to open position, said thermostat operated means being operated by said last-named means to move said apparatus control means to supply heat to said medium, and means responsive to the temperature of said medium for deenergizing said thermostat operated means whereby said apparatus control means will move to said position to stop heating of said medium.

9. A heating system comprising a furnace having a bonnet and having draft and check dampers, means continuously acting to move said draft damper to closed and said check damper to open position, motor means operable to overcome said means and reverse the positions of said dampers, a hot air duct leading from said bonnet to a room to be heated, a damper in said duct, means acting to close said duct damper, a thermostat responsive to temperature in said room, electrically energized means operable to overcome said duct damper closing means and having its circuit controlled by said thermostat, said last-named means acting to move said duct damper to open position when said thermostat calls for heat, a switch controlling the circuit of said motor means and movable to closed position by and upon operation of said electrically energized means, and means responsive to bonnet temperature operable to break the circuit of said motor means whereby said continuously acting means will close said draft damper and open said check damper at a predetermined high temperature in said bonnet.

10. A device of the character described, comprising a supporting member, motor means carried by said member, a rocker member fulcrumed on said member, a thrust member operatively connecting said motor means to said rocker member, a lever having a fulcrum support, cooperable abutment means on said rocker member and said lever, and a spring having its opposite ends acting on said lever and said rocker member to hold said abutment means in engagement and whereby said rocker member and said lever are relatively movable.

11. A device of the character described, comprising a supporting member, motor means carried by said member, a rocker member journaled on said member, a thrust member operatively connecting said motor means to said rocker member, a lever journaled concentrically with said rocker member on said supporting member, and a spring acting on said lever and on said rocker member, said spring serving to hold said lever to said rocker member for unitary movement, said lever being movable relative to said rocker member against the force of said spring whereby said rocker member and said lever are relatively movable.

12. A device of the character described, comprising a supporting member, motor means carried by said member, a rod mounted on said supporting member, a rocker member pivotally supported by said rod, a thrust member operatively connecting said motor means to said rocker member, a lever pivotally supported by said rod, a coil spring surrounding said rod and acting at one end on said rocker member and at its other end on said lever, and means to limit movement of said lever and said rocker member relative to each other by said spring whereby said rocker member and said lever are relatively movable.

13. A device of the character described, comprising a supporting member having opposed flanges, motor means carried by said supporting member, a shaft extending between and supported by said flanges, a rocker member having flanges receiving said shaft, a lever mounted on said shaft, said lever and said rocker member being relatively movable, stop means on said lever and said rocker member to limit said relative movement in one direction, and a helical coil spring surrounding said shaft and holding said stop means in engagement.

14. A heating system comprising a furnace having draft and check dampers, a motor having a lever arm, means operatively connecting said arm to said dampers, said motor comprising an expansion chamber having a movable wall, a bulb element communicating with said chamber, an electric heating element for said bulb element, a thrust member operable by said wall, a pivotally supported member engaged by said thrust member, means operatively connecting said pivotally supported member and said lever arm, and a thermostat responsive to temperature created by said furnace and controlling said heating element.

15. A heating system comprising a furnace having draft and check dampers, a motor having a lever arm, means operatively connecting said arm to said dampers, said motor comprising an expansion chamber having a movable wall, a bulb element communicating with said chamber, an electric heating element for said bulb element, a thrust member operable by said wall, a pivotally supported member engaged by said thrust member, means operatively connecting said pivotally supported member and said lever arm, said connecting means including a spring normally urging said pivotally supported member and said arm into engagement with each other, and a thermostat responsive to temperature created by said furnace and controlling said heating element.

16. A device of the character described, comprising a supporting member, motor means secured to the underside of said supporting member, said supporting member having an aperture therethrough, a rocker member pivotally mounted upon said supporting member, a thrust member extending through said aperture and operatively connecting said rocker member and said motor means, a lever having a fulcrum support, and means connecting said rocker member and said lever, said last-named means including a spring to permit relative movement between said lever and said rocker member.

17. A device of the character described, comprising a supporting member, motor means secured to the underside of said supporting member, said supporting member having an aperture therethrough, a shaft carried by said supporting member, a rocker member pivotally supported by said shaft, a thrust member extending through said aperture and operatively connecting said rocker member and said motor means, a lever pivotally supported by said shaft, and means connecting said rocker member and said lever.

18. A device of the character described, comprising a supporting member, a casing member secured to the underside of said supporting member and having an open top, diaphragm means closing the open top of said casing member and forming therewith an expansion chamber, said supporting member having an opening therethrough, a thrust member engaging said diaphragm means and extending through said opening, a bulb element communicating with said chamber, an electric heating means for said bulb element, supporting arms extending upward from said supporting member, a rocker member pivotally supported by said arms, means operatively connecting said thrust member and said rocker member, a lever pivotally supported by said arms, and means operatively connecting said rocker member and said lever.

LEWIS W. EGGLESTON.